United States Patent [19]

Kinbara

[11] Patent Number: 5,374,798
[45] Date of Patent: Dec. 20, 1994

[54] ELECTRIC POWER-SOURCE APPARATUS FOR DISCHARGE PROCESSING MACHINE

[75] Inventor: Yoshihide Kinbara, Nagoya, Japan

[73] Assignee: Mitsubishi Denki Kabushiki Kaisha, Tokyo, Japan

[21] Appl. No.: 8,982

[22] Filed: Jan. 26, 1993

[30] Foreign Application Priority Data

Jan. 28, 1992 [JP] Japan .................. 4-012903

[51] Int. Cl.⁵ .................. B23H 1/02; B23H 7/14
[52] U.S. Cl. .................. 219/69.18; 219/69.13
[58] Field of Search .................. 219/69.13, 69.18; 323/283, 284

[56] References Cited

U.S. PATENT DOCUMENTS

| 3,956,609 | 5/1976 | Marendaz | 219/69.18 |
| 4,350,863 | 9/1982 | Inoue | 219/69.18 |
| 4,673,789 | 6/1987 | Ozaki et al. | 219/69.13 |
| 4,725,769 | 2/1988 | Cini et al. | 323/283 |
| 5,083,001 | 1/1992 | Kinbara et al. | 219/69.18 |
| 5,126,525 | 6/1992 | Kaneko et al. | 219/69.13 |
| 5,214,558 | 5/1993 | Melnyk | 323/283 |

FOREIGN PATENT DOCUMENTS

| 08337 | of 0000 | Japan . |
| 49-43297 | 4/1974 | Japan . |
| 57-33950 | 7/1982 | Japan . |
| 234732 | 8/1990 | Japan . |
| 355117 | 3/1991 | Japan . |
| 373220 | 3/1991 | Japan . |
| 3208521 | 9/1991 | Japan . |
| 1432045 | 4/1976 | United Kingdom . |

Primary Examiner—Geoffrey S. Evans
Attorney, Agent, or Firm—Sughrue, Mion, Zinn, Macpeak & Seas

[57] ABSTRACT

An electric power-source apparatus for a discharge processing machine comprises a constant-current supply section having a first switching element and an output-current interrupting section having a second switching element. Processing power is supplied to a location between an electrode and a workpiece which are arranged within a dielectric. A comparator compares output-current detecting values from the constant-current supply section, and upper-limit addition voltage and lower-end subtraction voltage of an output-current command section with each other, respectively. Output current from the constant-current supply section is controlled by a first flip flop. A timer section is controlled by a discharge command from a discharge command section and a discharge-time command section. The output-current interrupting section is controlled by the comparator, the timer section and a second flip flop.

12 Claims, 12 Drawing Sheets

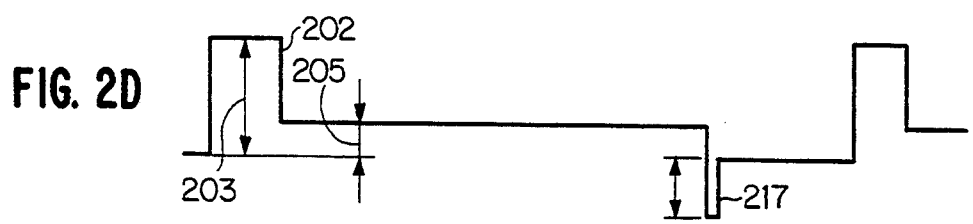
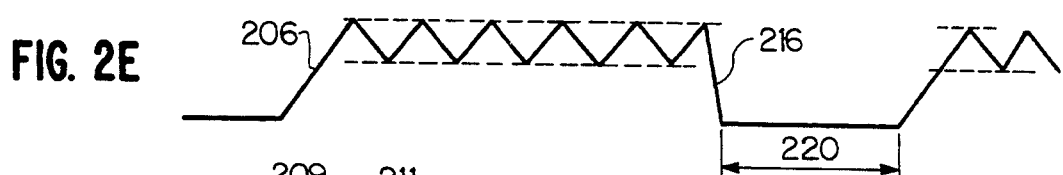
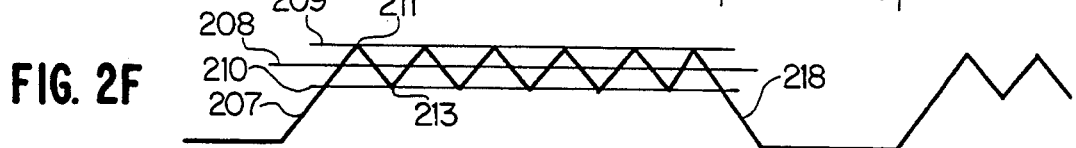
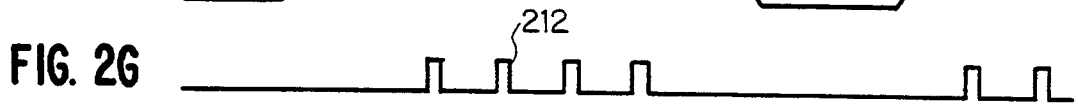
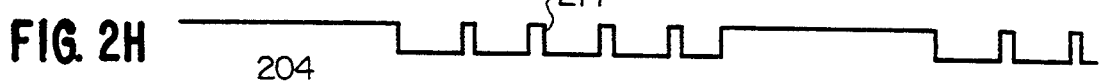

FIG. 4A
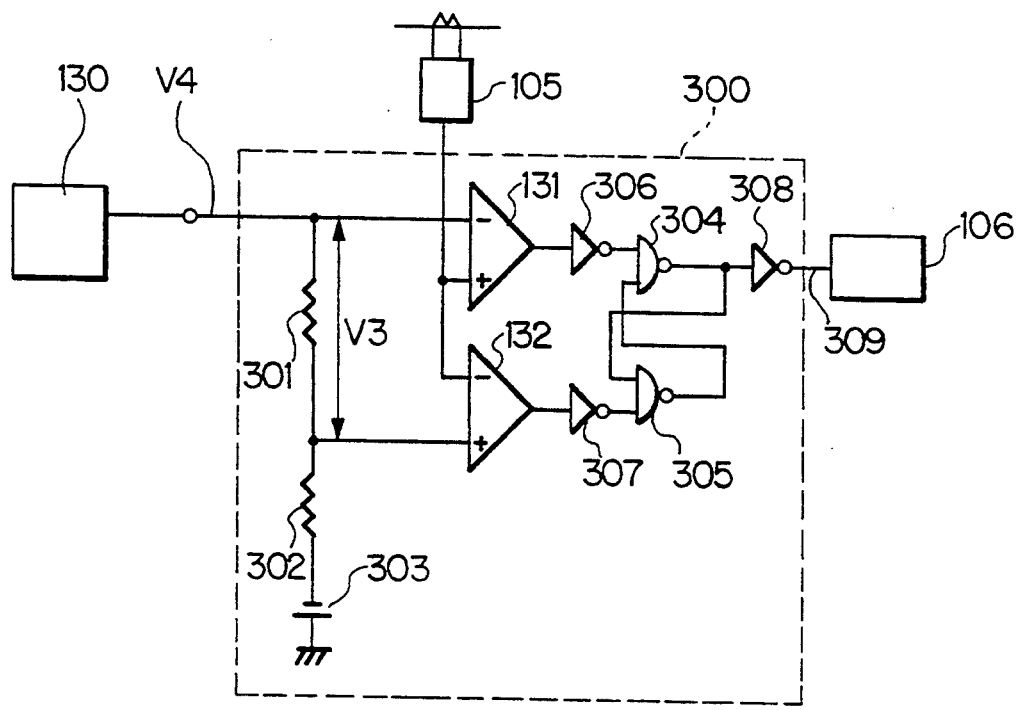
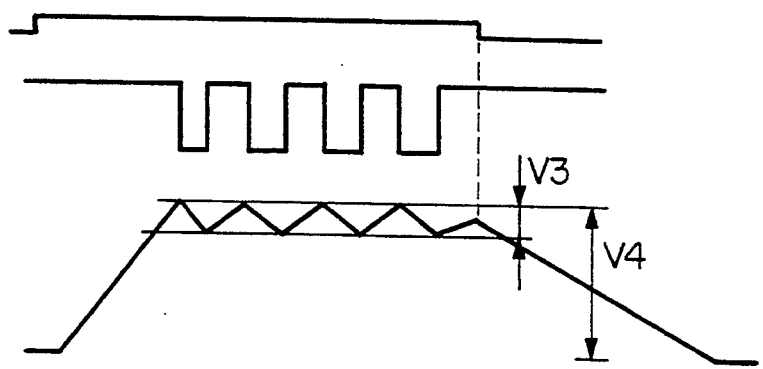
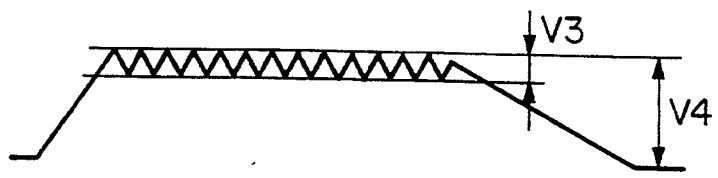

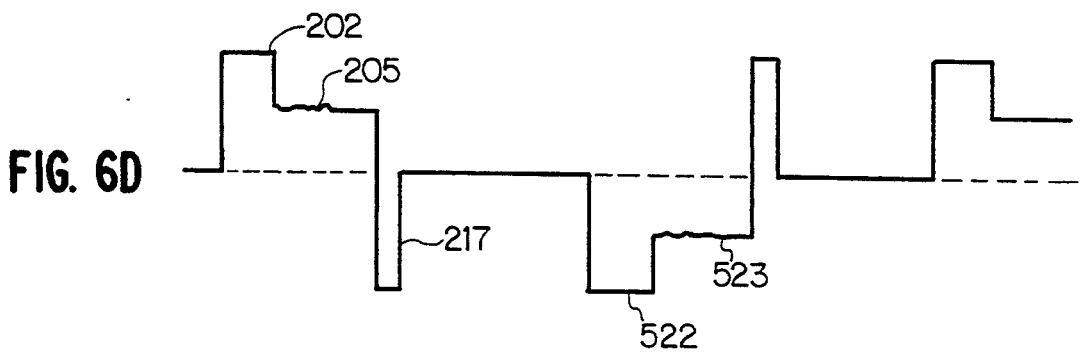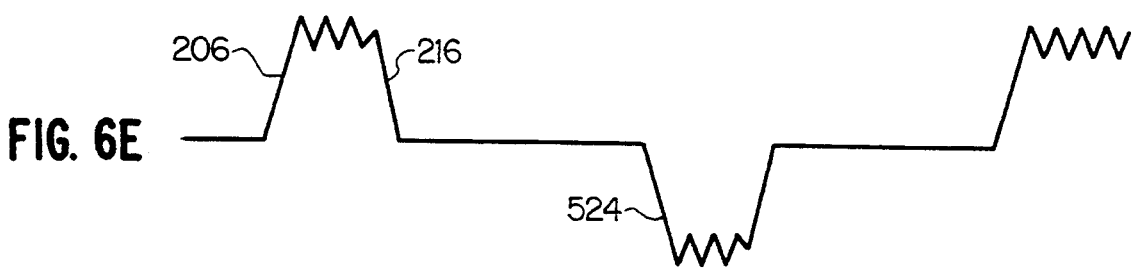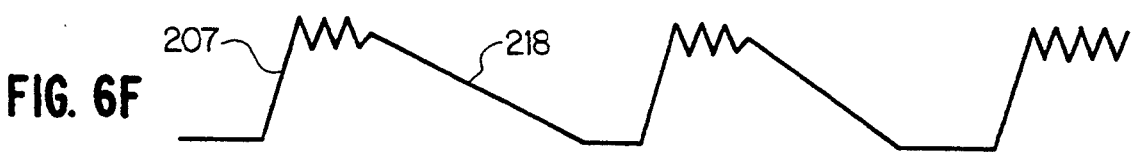

ELECTRIC POWER-SOURCE APPARATUS FOR DISCHARGE PROCESSING MACHINE

FIELD OF THE INVENTION

The present invention relates to a power-source apparatus for a discharge processing machine, for supplying processing power to a location between an electrode and a workpiece which are arranged within a dielectric.

BACKGROUND OF THE INVENTION

As background art, "A method of controlling an electric power for discharge processing" disclosed in Japanese Patent Publication No. HEI 2-34732 is shown in FIG. 12 of the attached drawings. In FIG. 12, the reference numeral 17 denotes a discharge detecting unit for detecting that discharge occurs at a location between an electrode and a workpiece; 18, an output signal line of the discharge detecting unit 17; 19, a logic circuit for selecting driving of switching elements 21~25; 20a~20e, AND circuits; 26~30, resistances for selecting values of processing current, which are connected in series to the switching elements; 31~35, outputs from the logic circuit 19. A conventional power-source apparatus for discharge processing has been constructed as described above.

Operation of the above-described circuit will next be described with reference to FIG. 13 and FIGS. 14A and 14B. At the start of processing, the logic circuit 19 outputs an ON-signal to all of the switching elements 21~25. At this time, as shown in FIG. 13, a pulse signal P issues from an oscillator 3. The switching elements 21~25 are turned ON in synchronism with the pulse signal P. A voltage waveform 36 as processing voltage illustrated in FIG. 14A and a current waveform 37 illustrated in FIG. 14B are supplied, to a location between poles 5.

Next, when discharge occurs between the poles 5, the discharge detecting unit 17 outputs a discharge detecting signal D shown in FIG. 13. The logic circuit 19 turns OFF the switching elements 23~25, while the switching elements 21 and 22 remain turned ON. In this example, the resistances 26 and 27 are an internal impedance in a power source for producing original predetermined discharge current. That is, no-load time until voltage is applied to the location between the poles 5 so that discharge occurs is controlled such that all of the switching elements 21~25 are turned ON, and the internal impedance in the power source is brought to a value sufficiently small as compared with the interpole impedance.

When the discharge occurs between the poles 5, the switching elements 21~25 are so controlled in switching as to produce the original predetermined discharge current, and the internal impedance in the power source is controlled to a predetermined value.

As described above, the conventional method of controlling the power source for discharge processing is a system in which the switching elements are turned ON/OFF, and the resistances are switched, to supply the discharge current.

In addition to the above, as reference literatures relating to the present invention, there are "A power source for discharge processing" disclosed in Japanese Patent Laid-Open No. HEI 3-208521, "A waveform control unit for a discharge processing apparatus" disclosed in Japanese Patent Laid-Open No. HEI 3-73220, and "A power source apparatus for discharge processing" disclosed in Japanese Patent Laid-Open No. HEI 3-55117.

Since the above-described conventional method of controlling the power source for discharge processing has been constructed or arranged as described above, there are the following problems. That is, first, much of the electric power supplied from the power source is consumed by the resistances so that a power source of large electric power capacity is required. Thus, since the resistances generate heat, a cooling unit is required, that is, an arrangement is large-sized, so that small-sizing of the apparatus is impeded. Further, since electric power efficiency is low, waste electric power is consumed so that a running cost will increase or rise. Furthermore, since there are many cases where the only power source used will transform alternating power to a voltage that is then rectified and is smoothed, the processing current largely varies or fluctuates when the voltage of the alternating power source fluctuates so that processing accuracy is deteriorated. Moreover, fourthly, when processing is made or executed by a power-source apparatus for a discharge processing machine, of a direct-current output, micro cracks occur in a processed surface of the workpiece, so that the processing quality is deteriorated, and electrolytic corrosion occurs in the electrode, the workpiece and the like. Finally, when short-circuiting occurs between the poles, the processing current flows more than a set value so that there is a fear that the electrode and the workpiece are damaged.

SUMMARY OF THE INVENTION

It is a first object of the invention to provide a power-source apparatus for a discharge processing machine, in is which discharge current controlled by switching, electric power efficiency is raised, and the discharge current is controlled to a predetermined value, so that the effect or influence of fluctuation in power source voltage is eliminated, in which the apparatus is small in size, light in weight and low in cost, and in which power efficiency is superior.

Further, it is a second object of the invention is to provide a power-source apparatus for a discharge processing machine, in which there is no electrolytic corrosion due to an alternating output, and in which a processing quality is superior.

In achieving these objects, an electric power-source apparatus for a discharge processing machine includes a plurality of power-source units, which comprise respective constant-current supply means and respective output-current interrupting means, and a plurality of conductors through which processing power is supplied, wherein the conductors are the same in length as each other and are located close to each other, and wherein the power-source units are connected to each other at a location close to the location between the electrode and the workpiece. Due to this arrangement, a balance action of current is executed by the resistances and inductances of the respective conductors. Also, the output impedances of the respective power-source units for the discharge processing machines are connected in parallel to each other so that a rise and a fall of the output current in large current are executed at a high speed.

Furthermore, the current is supplied simultaneously to the plurality of electrodes or the workpiece by the plurality of power-source units for discharge processing machines.

Furthermore, in achieving these objects, an electric power-source apparatus for a discharge processing machine includes a plurality of power-source units, which comprise respective constant-current supply means and respective output-current interruption means, wherein at least one of the plurality of electric power-source units for the discharge processing machine is connected to one of a corresponding one of a plurality of electrodes and the workpiece.

Means for controlling the output current from the constant-current supply section in the invention controls of the discharge current to a constant current by comparing a detected value of current with a signal from an output-current command section. Further, means for controlling the output-current interrupting section turns ON/OFF, at a high speed, the discharge current supplied to the location between the electrode and the workpiece.

Further, by an output-current interrupting section which comprises the plurality of switching elements connected in bridge to each other, the polarity of the output voltage is inverted every occurrence of discharge, whereby the output voltage is converted to an alternating voltage.

Furthermore, discharge time is controlled such that a mean value of the discharge voltage at the location between the electrode and the workpiece is brought to zero.

Moreover, the first switching element is turned OFF, to reduce the current of the reactor quickly.

When an electric power source is constructed in accordance with the present invention, the discharge current is controlled by switching so that the power efficiency rises, and the discharge current is controlled to a predetermined current. An influence in fluctuation of the power-source voltage is also eliminated. Thus, it is possible to produce the power-source apparatus for the discharge processing machine, which is small in size, which is light in weight, which is low in cost, and which is superior in power efficiency so that energy is saved.

Further, discharge processing due to output of alternating current is made possible, and minute cracks in the processed surface of the workpiece is prevented from being formed, whereby the processing quality is improved and it is possible to prevent catalytic corrosion from occurring on the electrode, the workpiece and the like.

Furthermore, since the mean value of the discharge voltage is so controlled as to be brought always to zero, it is possible to prevent minute cracks from being formed in the processing surface of the workpiece so that the processing quality is improved. Moreover, it is possible to prevent catalytic corrosion from occurring on the electrode, workpiece and the like.

Further, the following superior power-source apparatus for the discharge processing machine can be provided. That is, even if a discharge idle period is shortened, the discharge current starts from zero when discharge occurs so that there is less in electrode consumption, and high-speed processing is made possible. Since the energy of the reactor is regenerated to the power source E0, energy is saved. High-speed processing and low electrode-consumption processing can be made possible by the same power source.

Furthermore, a large electrode or workpiece can be processed at a high speed. Since the same power-source apparatus for the discharge processing machine can be used, manufacturing is easy.

Moreover, a relatively small-sized electrode can be used per each of the electrodes so that manufacturing of the electrodes is made easy, and the electrodes can be formed low in cost. Further, since there is produced a superior processed surface if the electrodes are small, it is possible to produce the power-source apparatus for the discharge processing machine in which finishing is superior.

other objects and features of this invention will become understood from the following description with reference to the accompanying drawings.

BRIEF DESCRIPTION OF THE DRAWINGS

FIG. 2 is a waveform view and a timing chart showing operation of the power-source apparatus for the discharge processing machine illustrated in FIG. 1;

FIG. 4A is a circuit diagram showing another embodiment of a current control section in the power-source apparatus for the discharge processing machine illustrated in FIG. 1;

FIG. 4B shows waveforms which depict the operation of the current control section shown in FIG. 4A;

FIG. 6 is a waveform view and a timing chart showing operation of the power-source apparatus for the discharge processing machine illustrated in FIGS. 5A and 5B;

FIGS. 14A and 14B are waveform views showing operation of the power-source apparatus of the discharge processing machine illustrated in FIG. 12.

DESCRIPTION OF THE EMBODIMENTS

Various embodiments of the invention will hereunder be described with reference to the accompanying drawings.

Figure 1A:
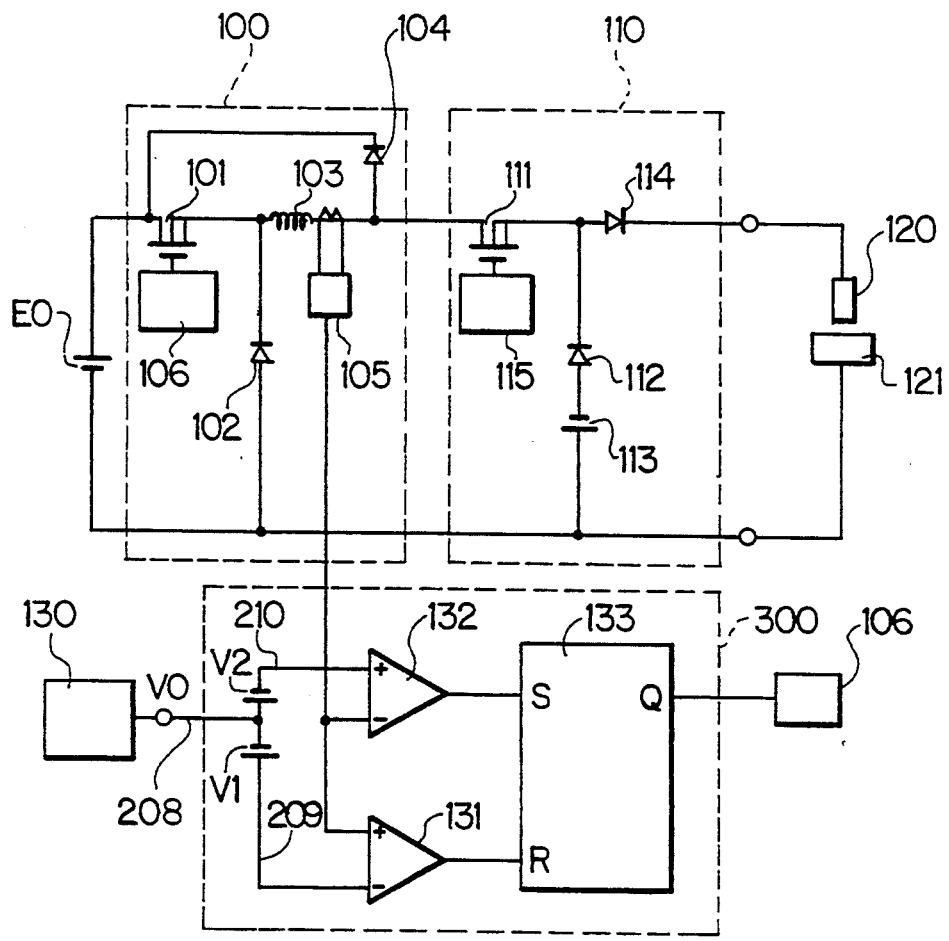
FIG. 1A is a circuit diagram showing a first embodiment of a power-source apparatus for a discharge processing machine, according to the invention.
Figure 1B:
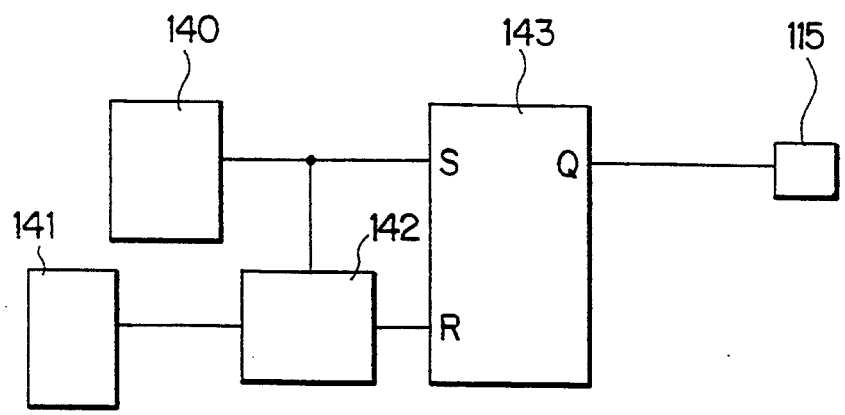
FIG. 1B is a circuit diagram which complements FIG. 1A in showing a first embodiment of a power-source apparatus according to the invention.

A power-source apparatus for a discharge processing machine shown in FIGS. 1A and 1B as a first embodiment of the invention. In FIGS. 1A and 1B, a constant-current supply section 100 having a switching element 101, a diode 102 and a reactor 103 is connected to a power source E0 for supplying D.C. voltage, and outputs current to an output-current interrupting section 110. The constant-current supply section 100 is arranged by a step-down chopper due to the first switching element 101, the diode 102 and the reactor 103, and a diode 104 is connected to a location between an output and an input.

Further, the power-source apparatus comprises a current detector 105 for detecting current passing through the reactor 103. Furthermore, the output-current interrupting section 110 includes a second switching element 111, a diode 112, a series circuit with respect to a voltage source 113, and a diode 114. The output-current interrupting section 110 supplies processing power to a location between an electrode 120 and a workpiece 121 which are arranged within a dielectric, to execute discharge processing.

Current flowing through the reactor 103 of the constant-current supply section 100 is detected by the current detector 105. A voltage source V1 is connected, as an upper-limit addition value 209, to a signal 208 from an output-current command section 130, while a voltage source V2 is connected, as a lower limit subtraction value 210, to the signal 208 from the output-current con, hand section 130. The power-source apparatus comprises a first comparator 131 for comparing a signal from the current detector 105 and the upper-limit addition value 209 with each other, a second comparator 132 for comparing the signal from the current detector 105 and the lower-limit subtraction value 210 with each other, and a timer section 142 having a first flip flop 133 and ON-OFF controlling the first switching element 101 by a gate drive circuit 106 to control the output current from the constant-current supply section 100 to a predetermined current value. The timer section 142 is controlled by a signal from a discharge command section 140 and a command value of a discharge-time command section 141. An output signal from a second flip flop 143 controls a gate drive circuit 115, and the second switching element 111 is ON-OFF controlled by the gate drive circuit 115, whereby the output-current interrupting section 110 is controlled.

Referring to FIG. 2, waveform (a) denotes a signal from the discharge command section. An output Q from the flip flop 143 illustrated at 201 of waveform (c) is brought to an active (High) one. Thus, the switching element 111 of the output-current interrupting section 110 is turned ON so that no-load voltage 203 is applied to a location between the electrode 120 and the workpiece 121, like at 202 of waveform (d). This is because the no-load voltage 203 is the same as voltage of the power source E0 and, at this time, the switching element 101 is turned ON by the flip flop 133, as shown at 204 of waveform (i). Subsequently, when discharge occurs between the electrode 120 and the workpiece 121, the no-load voltage is brought to discharge voltage as seen at 205 of waveform (d). The voltage is generally 20~30 V.

When discharge occurs, current flows from the power source E0 through the switching element 101, the reactor 103, the switching element 111 and the diode 114 and flows through the electrode 120 and the workpiece 121. The output current is shown at 206 of waveform (e). The current 206 increases on the basis of a current increasing rate which is determined by an inductance of the reactor 103. The reference numeral 207 of waveform (f) denotes a signal from the current detector 105 of the reactor 103.

In waveform (f), an upper-limit addition value 209 and a lower-limit subtraction value 210 of a signal 208 from the output-current command section 130 are shown simultaneously. When the current detecting value 207 increases by occurrence of the discharge so as to reach the upper-limit addition value 209, the output from the comparator 131 is brought, at 211, to an active (High) one as shown by 212 of waveform (g), to reset the flip flop 133. Accordingly, an output from the flip flop 133 is brought to a passive (Low) one so that the switching element 101 is turned OFF. Subsequently, the output current is supplied to the electrode 120 through the diode 102, the reactor 103, the switching element 111 and the diode 114 so that the current is reduced.

When the current passing through the reactor 103 is lowered to the lower-limit subtraction value 210, the output from the comparator 132 is brought, at 213 of waveform (f), to an active (High) one as shown at 214 of waveform (h), to set the flip flop 133. Accordingly, the output from the flip flop 133 is brought to an active (High) one so that the switching element 101 is again turned ON. Subsequently, the output current is supplied to the electrode 120 through the switching element 101, the reactor 103, the switching element 111 and the diode 114 so that the current increases. Such operation is repeated so that the output current is controlled to a value of the current command section 130. If it is assumed that a signal from the output-current command section 130 is V0, then a ripple rate or ratio R of the output current can be found by the following equation:

$$R = (V1 + V2)/V0 \times 100 \%$$

Generally, a value of the ripple does not significantly influence the processing results. Accordingly, in the power-source apparatus for the discharge processing machine, the ripple is assumed to be a large value, whereby it is possible to set the inductance of the reactor 103, to a relatively small value.

When the signal from the discharge command section 130 is outputted like 200 of waveform (a), the timer section 142 is operated by a command value of the discharge-time setting section 141. When predetermined discharge time is reached, the flip flop 143 is reset by discharge stop pulses 215 in waveform (b).

Accordingly, when the switching element 111 is turned OFF by the gate drive circuit 115, the output current passes through the voltage source 113, the diode 112, the diode 114, the electrode 120 and the workpiece 121. At this time, since the output voltage is brought to negative voltage by the voltage source 113, like 217 of waveform (d), the output current is abruptly reduced like 216 of waveform (e). The decreasing time of the current is determined by the inductance of the wiring of the above-described current path. Since, however, the current of the reactor 103 is recirculated between the diode 104 and the switching element 101, a reduction of the current is slow and is brought to one like 218 of waveform (f). The waveform (j) denotes current flowing through the diode 104.

The reference numeral 220 of waveform (e) in FIG. 2 denotes a period during which the discharge current is zero, and which is called "discharge idle period". A similar waveform is shown also in FIG. 3. However, waveform (a) is the case where a discharge idle period 220 similar to that shown in FIG. 2 is relatively long, and indicates a time at which current of the reactor 103 is brought to zero until subsequent discharge current starts to flow. Accordingly, the discharge current 221 rises from zero in the form of a slope. That is, since a rise in current is a rising rate determined by the reactor and is constant, there are produced superior advantages that there is less in consumption of the electrode, and the like.

Figure 3A:
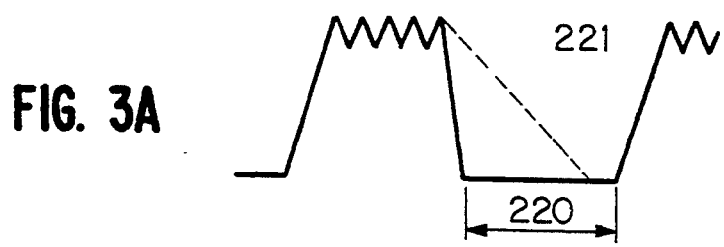
FIG. 3 is a waveform view showing operation of the power-source apparatus for the discharge processing machine illustrated in FIG. 1.
Figure 3B:
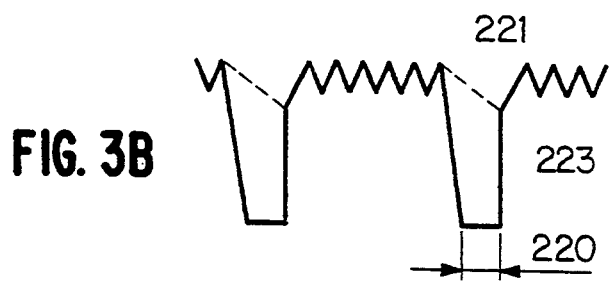
Figure 3C:
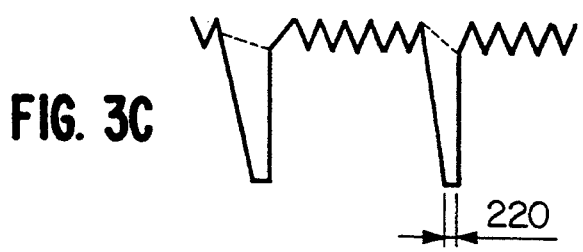

Further, as the idle period 220 is shortened as seen in waveform (b) in FIG. 3, the discharge current abruptly rises like 223, because the current of the reactor 103 is not yet brought to zero. When the idle period is shortened, there occurs processing in which prominence is given to the processing speed. Accordingly, it is better that a rise of the current is fast. Furthermore, as the idle period 220 is shortened like in waveform (c), an effective value of the discharge current further rises so that processing treatment at a high speed is made possible.

In this manner, high-speed processing and electrode-low-consumption processing are made possible by the same power source so that there are produced superior advantages that a cost is low, sizing is small, energy is saved, and the like.

FIG. 4A is a specific example of a current control section 300 illustrated in FIG. 1A. A command value from tile output-current command section 130 is brought to resistances 301 and 302, and voltage V3 across the resistance 301 due to a series connection of a voltage source 303 is brought to voltage of V1+V2, as illustrated in FIG. 1A. A signal from the current detector 105 is inputted to the comparators 131 and 132, and operation similar to that of the current control section 300 illustrated in FIG. 1 can be executed by a flip flop which is arranged by the inverters 306, 307 and 308 and NAND circuits 304 and 305. Accordingly, the switching element is controlled by the gate drive circuit 106, so that the current passing through the reactor 103 can be controlled.

FIG. 4B is a waveform view showing operation of the current control section 300. The waveform (a) denotes an output signal from the current control section 300, and a signal of 309 illustrated in FIG. 4A. The waveform (b) shows a current detected value of the current detector 105. A peak current corresponds to V4, and a ripple current corresponds to V3. The waveform (c) and (d) are signals from the current detector 105 at the time the voltage V4 of the command value from the output-current command section 130 is lowered. When the peak current V4 is lowered, V3 corresponding to the ripple current is also lowered. Accordingly, there is produced an advantage that, in discharge processing at small current, processing low in ripple can be executed by the same power-source apparatus for the discharge processing machine. Variation of the ripple current can easily be set by selection of values of the resistances 301 and 302 and the voltage source 303.

Figure 5A:
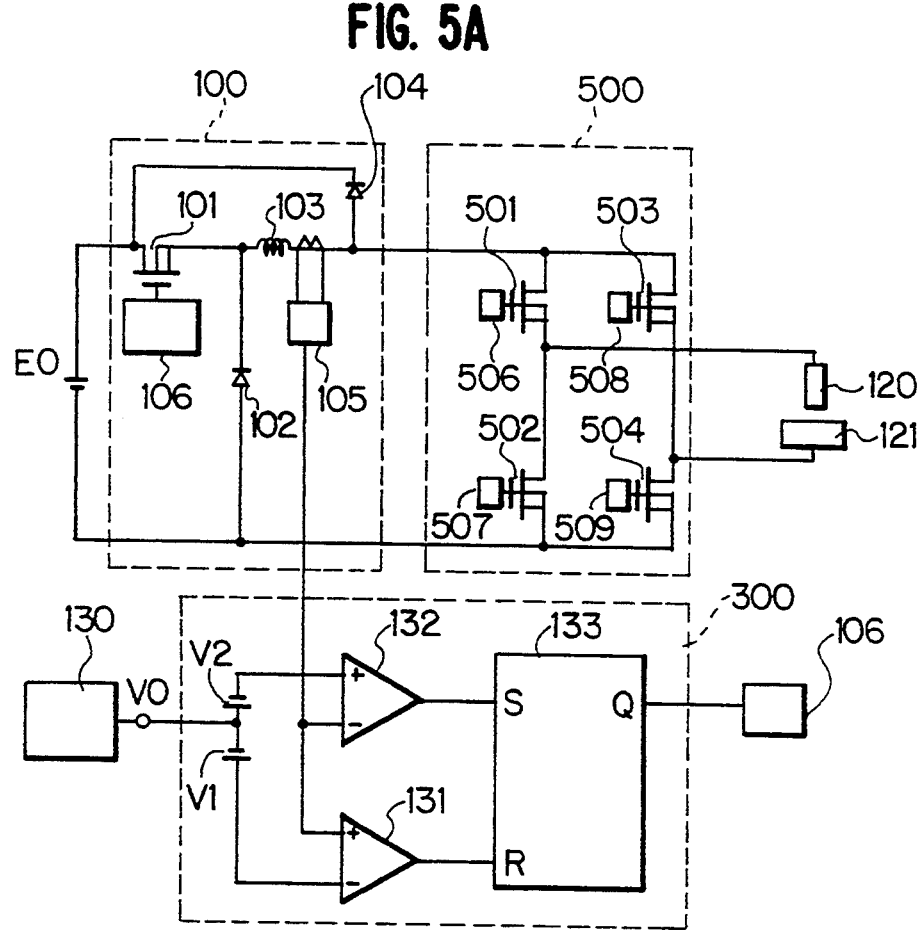
FIG. 5 is a circuit diagram showing a second embodiment of the power-source apparatus for the discharge processing machine, according to the invention.
FIG. 5B is a circuit diagram which complements FIG. 5A in showing a second embodiment of the power-source apparatus according to the invention.
Figure 5B:
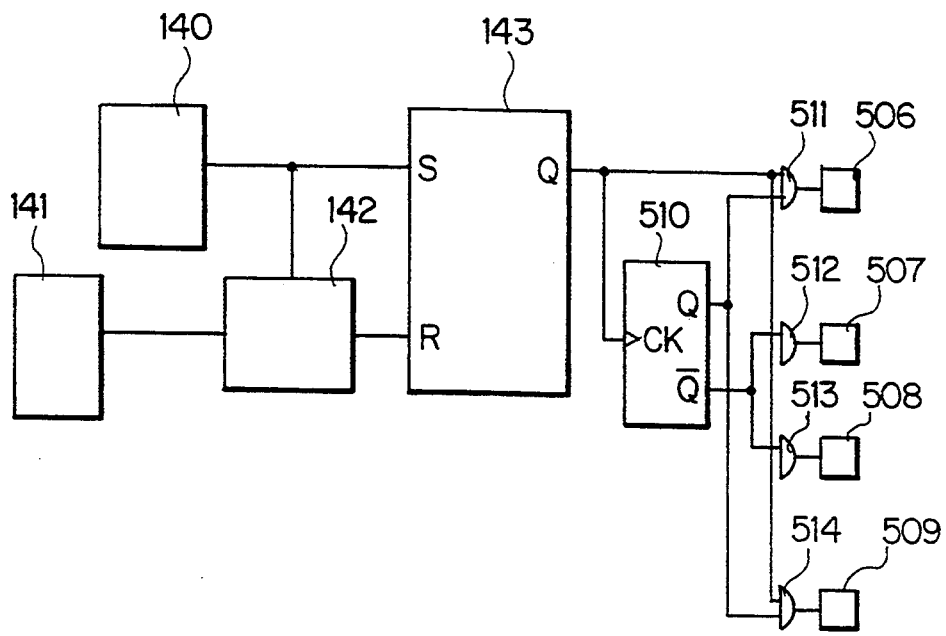

Next, a second embodiment of the invention is shown in FIGS. 5A and 5B. FIG. 5A shows a power-source apparatus for a discharge processing machine which comprises a constant-current supply section 100 arranged by a switching element 101, a diode 102 and a reactor 103, and an output-current interrupting section 500 which is arranged by bridge connection of switching elements 501, 502, 503 and 504. In the apparatus, processing power is supplied to a location between an electrode 120 and a workpiece 121 which are arranged within a dielectric. Operation of the constant-current supply section 100 and a current control section 300 is the same as that of the arrangement illustrated in FIG. 1.

The power-source apparatus of FIG. 5B comprises a timer section 142 controlled by a signal from a discharge con, hand section 140 and a command value from a discharge-time command section 141. An output from a flip flop 510 is inverted every occurrence of an output signal from a flip flop 143 to alternately output High and Low signals to AND circuits 511 and 514, and 512 and 513. Accordingly, gate drive circuits 506 and 509, and 507 and 508 turn ON/OFF alternately the switching elements 501 and 504, and 502 and 503. Thus, so-called alternating voltage in which polarity of the voltage is inverted every occurrence of a signal from the discharge con, hand section 140 is applied to a location between the electrode 120 and the workpiece 121, to execute discharge processing.

In FIG. 6, the waveform (a) denotes a signal from the discharge command section. An output Q from the flip flop 143 is shown at 201 of waveform (c) and is brought to an active state by a pulse 200. Thus, the switching elements 501 and 504 of the output-current interrupting section 500 are turned ON so that no-load voltage of positive polarity is applied, like 202 of waveform (d), to the location between the electrode 120 and the workpiece 121. The voltage is the same as the voltage of a power source E0. Subsequently, when discharge occurs between the electrode 120 and the workpiece 121, the no-load voltage is brought to the discharge voltage, as seen at 205 of waveform (d). The voltage is generally 20~30 V.

As discharge occurs, current flows from the power source E0 to the electrode 120, the workpiece 121 and the switching element 504 through the switching element 101, the reactor 103 and the switching element 501. The output current is shown at 206 of waveform (e). The current increases at a current increasing rate which is determined by an inductance of the reactor 103. The reference numeral 207 of waveform (f) denotes current of the reactor 103. The output current is controlled to a value specified by the current command section 130. When a signal from the discharge command section 140 is outputted at 200 of waveform (a), the timer section 142 operates or functions. When predetermined discharge time is reached by the command value from the discharge-time command section 141, the flip flop 143 is reset by 215 of the discharge stop pulse waveform (b).

Accordingly, all the switching elements are turned OFF by the AND circuits 511, 512, 513 and 514. As a result, the output current passes through the switching element 502, the electrode 120, the workpiece 121, the switching element 503, the diode 104 and the power source E0. At this time, since the output voltage is brought to negative voltage like 217 of waveform (d), the output current abruptly decreases like 216 of waveform (e). Since, however, the current of the reactor 103 is recirculated between the diode 104 and the switching element 101, decreasing of the current is slow and is brought to one like 218 of waveform (f).

Subsequently, the signal from the discharge command section 140 is outputted at 520 of waveform (a), the flip flop 143 is set at 521 of waveform (c), and the output Q is brought to an active (High) one so that the output from the flip flop 510 is inverted. Accordingly, the switching elements 502 and 503 of the output-current interrupting section 500 are turned ON is so that the no-load voltage of negative polarity is applied, like 522 of waveform (d), to the electrode 120 and the workpiece 121. The voltage is the same as the voltage of the power source E0. Subsequently, when discharge occurs between the electrode 120 and the workpiece 121, the no-load voltage is brought to a discharge voltage like 523 of waveform (d). The discharge current is such that a negative current indicated at 524 of waveform (e) flows between the electrode 120 and the workpiece 121. In this connection, a clock input (CK) to the flip flop 510 executes a similar operation if the clock input (CK) is connected to the output signal from the discharge command section 140.

As described above, according to the second embodiment, there are produced the following advantages. That is, discharge processing due to the output of alternating current is made possible. A processing quality is improved by prevention of minute cracks in the processed surface of the workpiece 121. It is possible to prevent electrolyte corrosion of the electrode 120, the workpiece 121 and the like from occurring.

Figure 7:
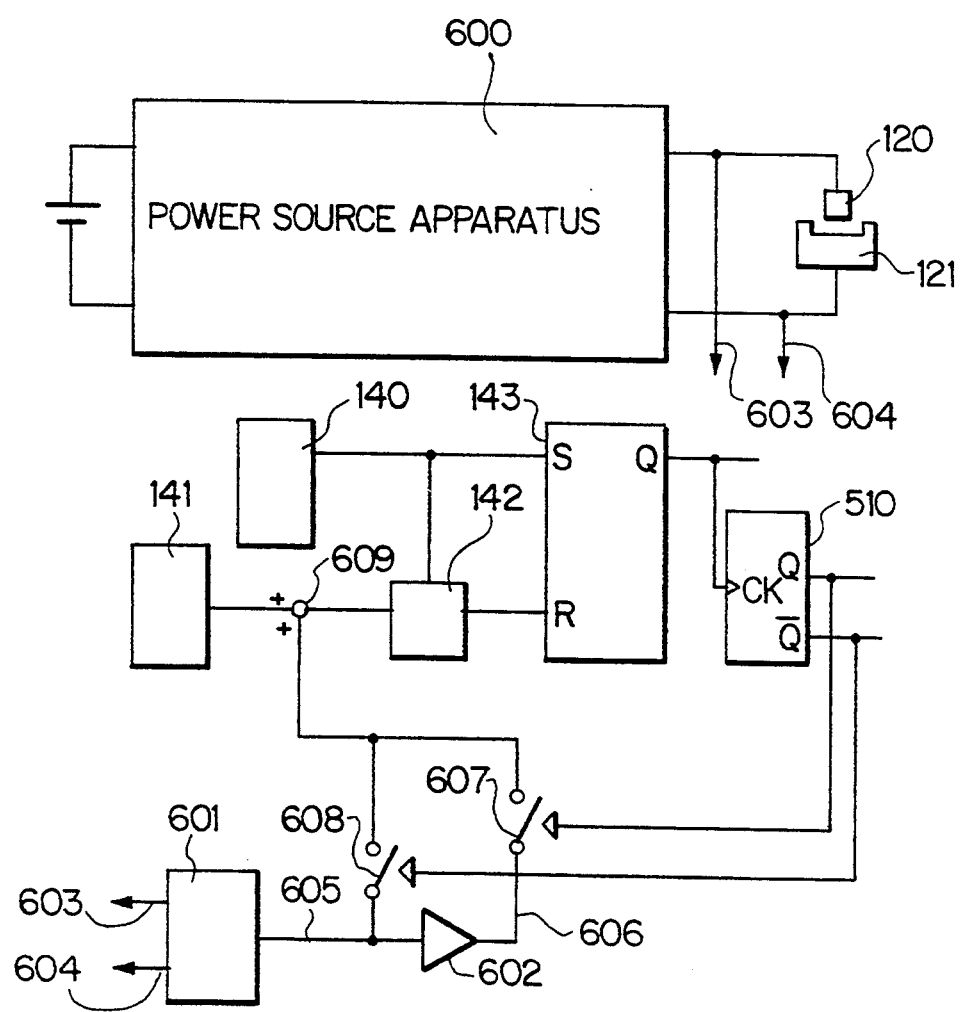
FIG. 7 is a circuit view showing a third embodiment of the power-source apparatus for the discharge processing machine, according to the invention.

Next, a third embodiment is shown in FIG. 7. There are provided an integrator 601 for generating a signal 605 on the basis of the discharge voltages 603 and 604 existing between the workpiece 121 and the electrode 120 connected to a power-source apparatus 600 for a discharge processing machine, which comprises a constant-current supply section and an output-current interrupting section (not shown). A voltage 606, which is opposite in polarity with respect to signal 605 is provided by an inversion amplifier 602. Since the output voltage of a flip flop 510 is inverted every occurrence of a discharge, switches 607 and 608 are turned ON/OFF by the output. The switch 607 is turned ON when an output Q from the flip flop 510 is an active (High) one. In the case where a mean value 605 of the discharge voltage is positive, the inverted mean value 606 is added to a discharge-time setting value by an adder 609. In this case, since the inverted mean value 606 is brought to a negative polarity, discharge time is shortened less than the setting value. Accordingly, since the positive discharge time is shortened, an entire mean value of the discharge voltage decreases in a negative direction.

Similarly, at a negative output, the switch 608 is turned ON. In the case where the mean value 605 of the discharge voltage is positive, the mean value 605 is added to the discharge-time setting value by the adder 609. In this case, since the mean value 605 is brought to a positive one, the discharge time is lengthened more than the setting value. Accordingly, since the negative discharge time is lengthened, an entire mean value of the discharge voltage decreases in a negative direction. In the same way, in case where the mean value 605 of the discharge voltage is negative, an entire mean value of the discharge voltage increases in a positive direction. Accordingly, the mean value of the discharge voltage is always controlled to become zero.

Figure 8:
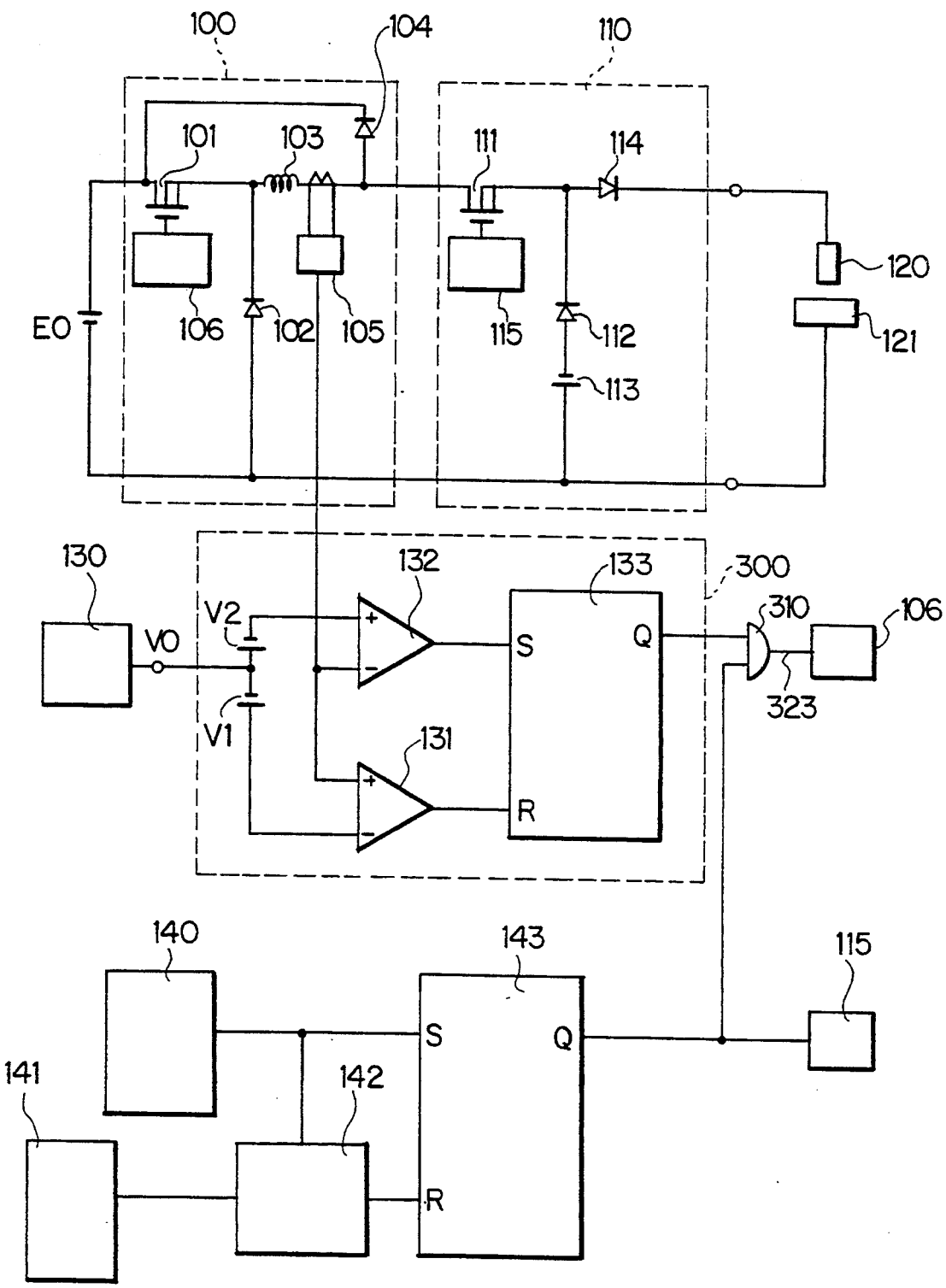
FIG. 8 is a circuit view showing a fourth embodiment of the power-source apparatus for the discharge processing machine, according to the invention.

Next, a fourth embodiment is shown in FIG. 8. In FIG. 8, a product of an output from a flip flop 133 and an output signal from a flip flop 143 is obtained or produced by an AND circuit 310 and is outputted to a gate drive circuit 106, to control a switching element 101.

Figure 9:
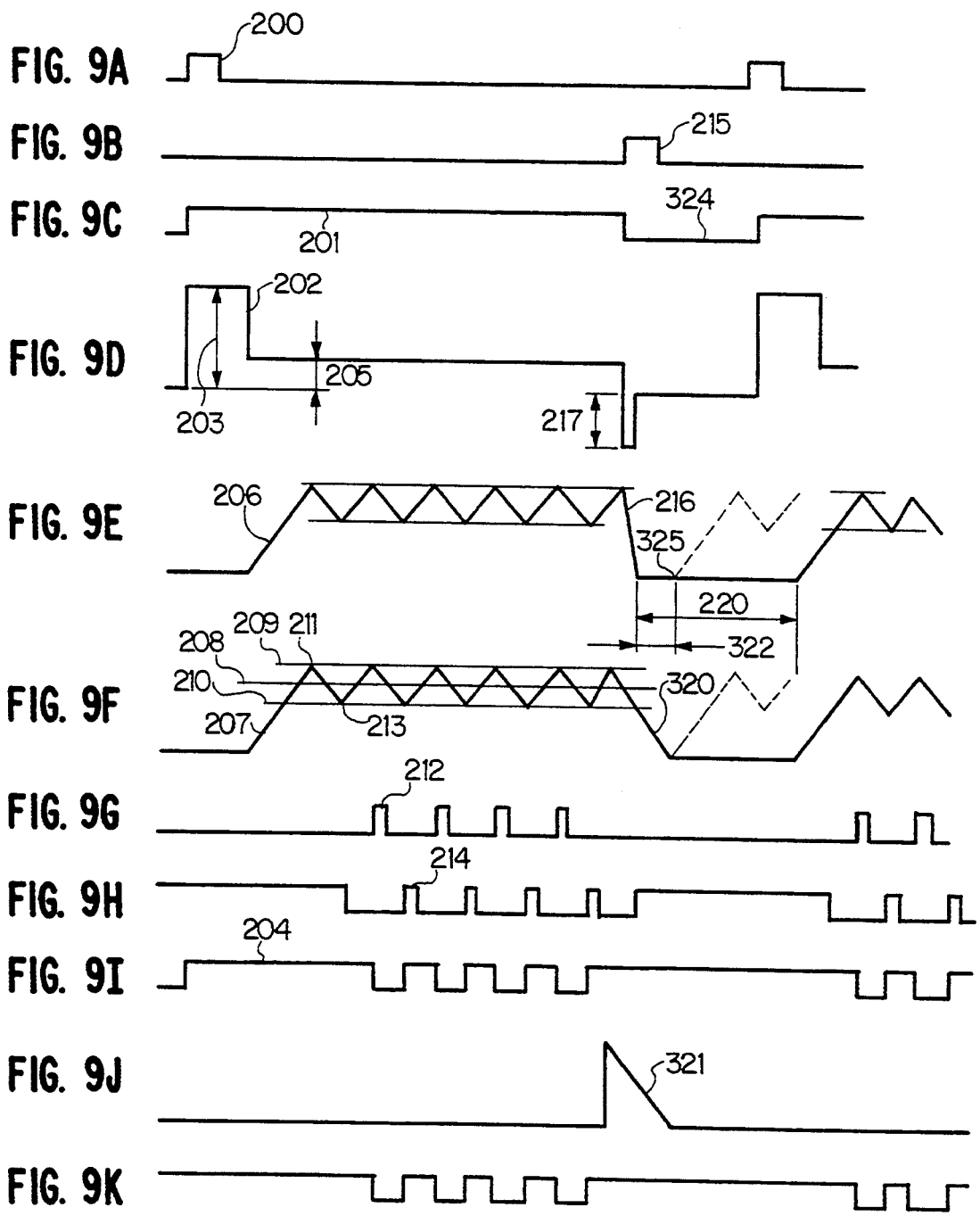
FIG. 9 is a waveform view and a timing chart showing operation of the power-source apparatus for the discharge processing machine illustrated in FIG. 8.

FIG. 9 is a series of related waveforms (a) (k), which are applicable to the operation of the current in FIG. 8. The waveform (k) in FIG. 9 is a waveform view of an output 323 from the AND circuit 310.

By doing so, the output from the flip flop 143 is brought, at 324 of waveform (c), to a passive (Low) value, and the switching element 101 is turned OFF. Current due to an electromotive force of a reactor 103 flows through a diode 102, the reactor 103, a diode 104 and a power source E0, and decreases while energy is regenerated to the power source E0. The current of the reactor decreases fast as compared with the first embodiment, as at 320 of waveform (f). The current passing through the diode 104 is shown at 321 of waveform (j). Accordingly, a discharge idle time 220 shown at waveform (e) can be shortened for a duration of time 322 as seen at waveform (e), at which the current at 320 of waveform (f) is brought to zero. Even if discharge occurs at 325 of waveform (e), discharge current begins or starts from zero. Thus, there are produced the following advantage. That is, there is provided the superior power-source apparatus for the discharge processing machine in which electrode consumption is low, high-speed processing treatment is possible, and energy is saved because energy of the reactor 103 is regenerated to the power source E0.

Figure 10:
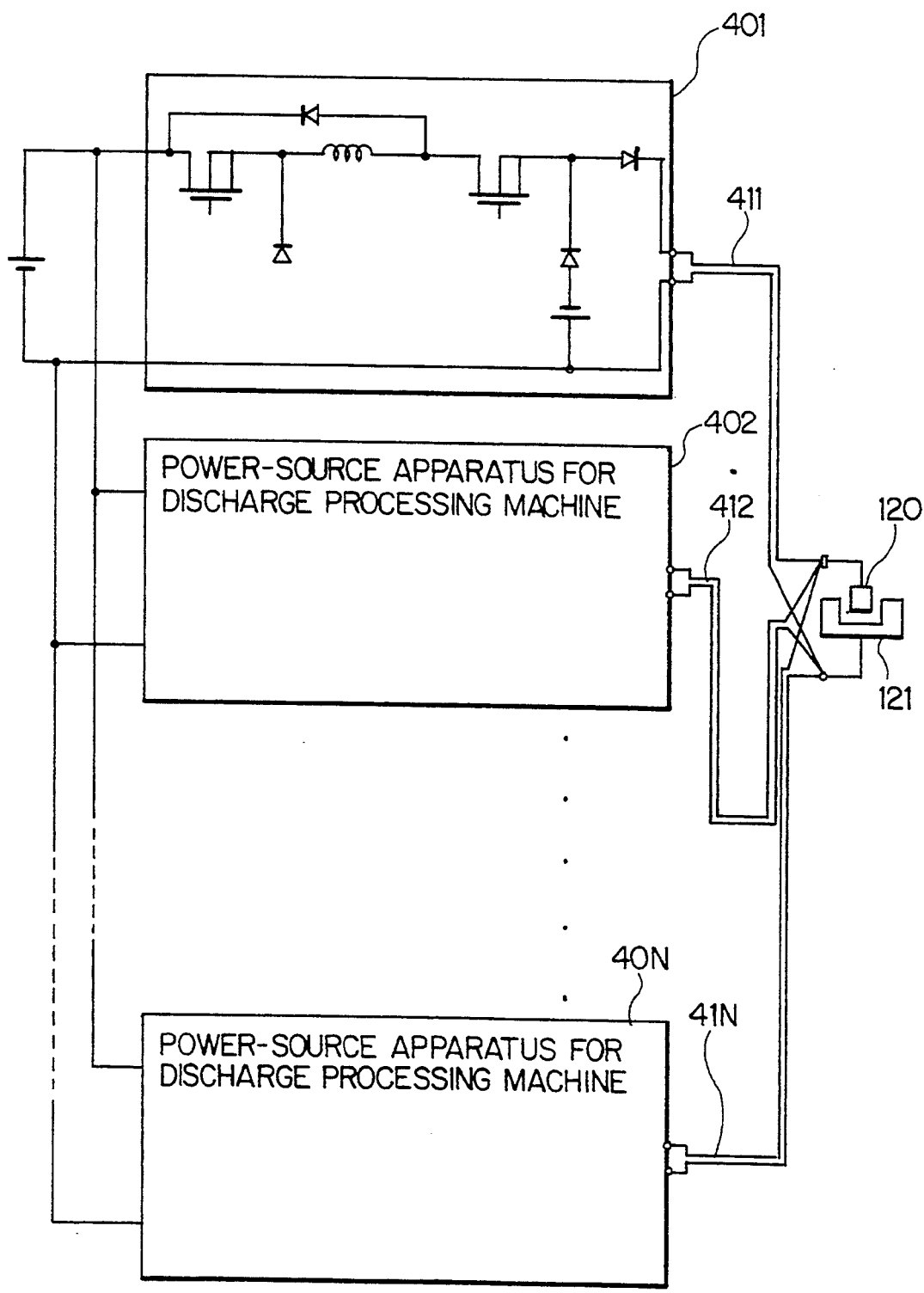
FIG. 10 is a circuit view showing a fifth embodiment of the power-source apparatus for the discharge processing machine, according to the invention.

Next, a fifth embodiment is shown in FIG. 10. The fifth embodiment comprises a plurality of power-source apparatuses 401, 402~40N for a discharge processing machine, each of which includes a constant-current supply section and an output-current interrupting section. Outputs, and an electrode 120 and a workpiece 121 are connected to each other by conductors 411, 412~41N which are the same in length as each other and which are located adjacent to or close to each other, to supply processing power. Thus, it is possible to supply large current to the large electrode 120 or workpiece 121 so that it is possible to process the workpiece at a high speed. Further, since the same or identical power-source apparatuses for the discharge processing machine 401, 402~40N can be used, there is produced an advantage that manufacturing is easy. As the conductors located close to each other, there are conductors in which conductors are twisted up, conductors in which plane or flat conductors are superimposed upon each other, coaxial cables, and the like. These have their respective similar advantages.

Figure 11:
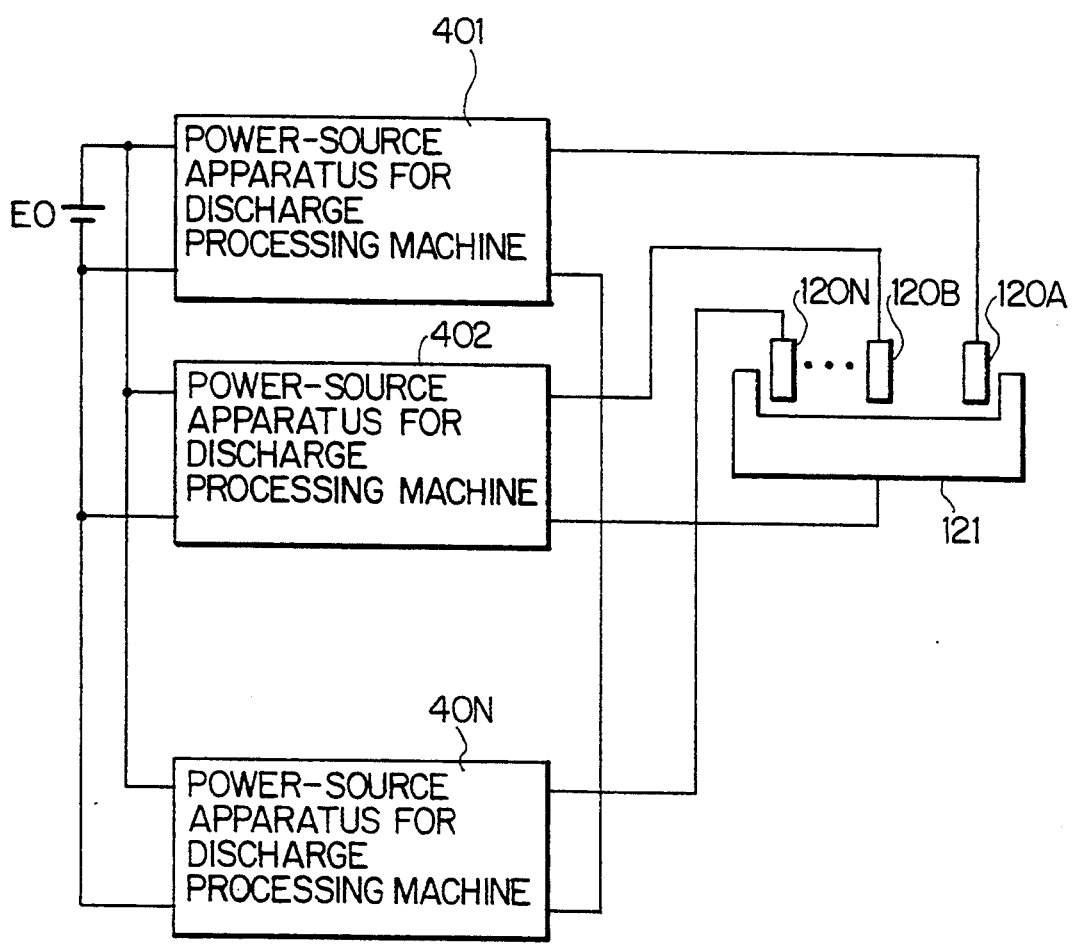
FIG. 11 is a circuit view showing a sixth embodiment of the power-source apparatus for the discharge processing machine, according to the invention.
Figure 12:
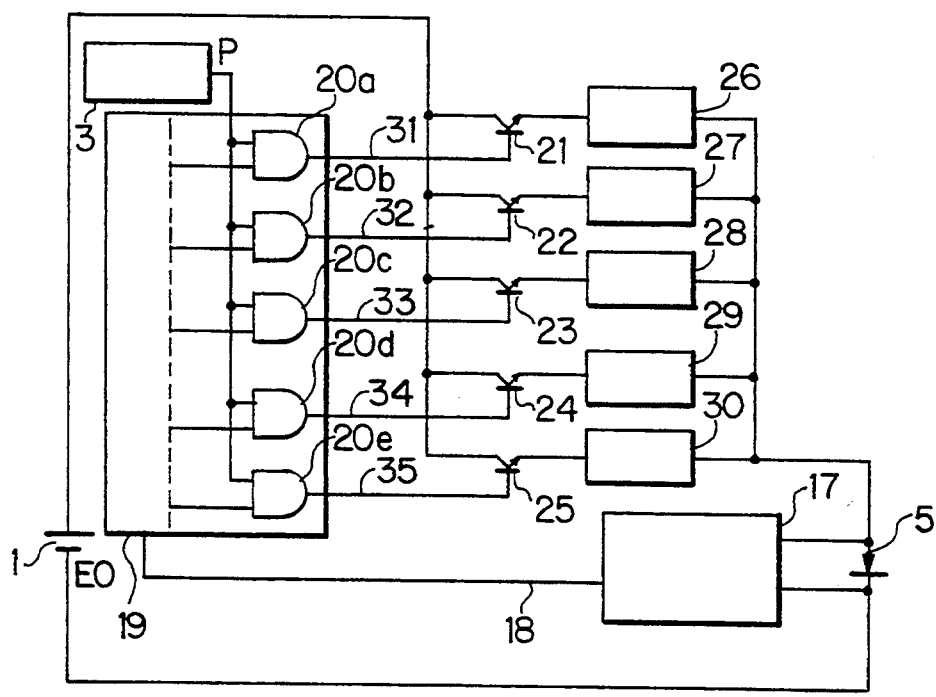
FIG. 12 is a circuit view showing an arrangement of a conventional power-source apparatus for a discharge processing machine.
Figure 13A:
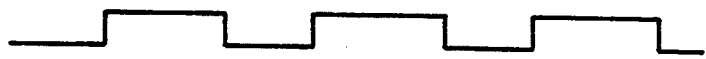
FIG. 13 is a timing chart showing operation of the power-source apparatus for the discharge processing machine illustrated in FIG. 12.
Figure 13B:
Figure 13C:
Figure 13D:
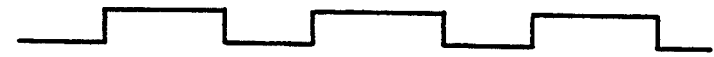
Figure 13E:
Figure 13F:
Figure 13G:

Next, a sixth embodiment is shown in FIG. 11. The sixth embodiment comprises a plurality of power-source apparatuses for a discharge processing machine 401, 402~40N each of which includes a constant-current supply section and an output-current interrupting section. The plurality of power-source apparatuses for the discharge processing machine 401, 402~40N are connected respectively to a plurality of electrodes 120A, 120B~120N or a workpiece 121, whereby relatively small electrodes can be used so that the electrodes can be manufactured easily and can be manufactured at a low cost. Further, the smaller the electrodes are, the superior there is produced a processed surface. Accordingly, there is produced an advantage that, in the case where a large area is processed, there is provided the power-source apparatus for the discharge processing machine which is superior in finishing.

In connection with the above, in the embodiments described above, MOSFETs are used for the switching elements for explanation. However, there are produced similar or identical advantages, if other switching elements such as IGBTs, transistors, SITs, GTOs or the like are used.

A BUK-type step-down converter is used as the constant-current supply section 100. However, there are produced similar or identical advantages, if a power-source apparatus such as a forward-type, a flyback type, a CUK converter, an inverter and the like in which current can be controlled by switching is used.

In connection with the above, in the embodiments described above, the control signal is shown in an analog circuit. However, there are produced similar or identical advantages if the control signal is computation in which a digital circuit, a microcomputer, a DSP (digital signal processor) or the like is used.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric power-source apparatus for a discharge processing machine wherein processing power is supplied to a gap location between at least one electrode and a workpiece, comprising:
   a constant-current supply having a first switching element;
   an output current interrupting unit for interrupting an output current having a second switching element and being connected to control the supply of power to a gap location;
   an output current command unit for supplying at least one of an upper limit value and a lower limit value;
   a comparator for comparing output current values of said constant-current supply, and said at least one of said upper-limit value and lower-limit value of said output current command unit with each other;
   a first flip flop unit responsive to said comparator for controlling said constant current supply;
   an output current controller for controlling an output of said constant-current supply in response to said first flip flop unit, said output current controller being controlled by a discharge command and a discharge time command; and
   a second flip flop unit responsive to said output current for controlling said output current interrupting unit.

2. An electric power-source apparatus for a discharge processing machine, according to claim 1, further comprising a multiplying unit for multiplying an output signal from said second flip flop unit by an output signal from said first flip flop unit, to control said first switching element.

3. An electric power-source apparatus for a discharge processing machine, according to claim 1, comprising a plurality of power-source units for the discharge processing machine, each of said units comprising a respective constant-current supply and respective output current interrupting means, and a plurality of conductors through which processing power is supplied, wherein said conductors are the same in length as each other and are located close to each other, and wherein said power-source units are connected to each other at a location close to the location between an electrode and a workpiece.

4. An electric power-source apparatus for a discharge processing machine, according to claim 1, comprising a plurality of electrodes and a plurality of power-source units for the discharge processing machine, each of which comprises a respective constant-current supply and respective output current interruption means, wherein at least one of said plurality of electric power-source units for the discharge processing machine is connected to one of a corresponding one of said plurality of electrodes and a workpiece.

5. An electric power-source apparatus for a discharge processing machine for processing a workpiece with an electrode within a dielectric, comprising:
   a constant-current supply having a first switching element and supplying a constant current;
   an output current interrupting unit having a plurality of switching elements, which are connected to each other in a bridge arrangement, for controlling the processing power supplied to a location between an electrode and a workpiece within said dielectric;
   an output current command unit for supplying an upper-limit and lower-limit value;
   a comparator for comparing output current values from said constant-current supply, and said upper-limit value and lower-limit value of said output current value command with each other, respectively;
   a first flip flop unit responsive to said comparator for controlling output current from said constant-current supply;
   a command unit for supplying a discharge command and a discharge-time command; and
   a second flip flop unit responsive to said discharge command and discharge-time command for controlling said output-current interrupting unit;
   a third flip flop unit responsive to said second flip flop unit for reversing the polarity of the output voltage every occurrence of an output by said second flip flop unit.

6. An electric power-source apparatus for a discharge processing machine, according to claim 5, further comprising a multiplying unit for multiplying an signal from said second flip flop and an output signal from said first flip flop means, the product thereof being operative to control said first switching element.

7. An electric power-source apparatus for a discharge processing machine, according to claim 5, comprising a plurality of power-source units for the discharge processing machine, each of which comprises a respective constant-current supply means and a respective output current interrupting unit, and plurality of conductors through which processing power is supplied, wherein said conductors are the same in length as each other and are located close to each other, and wherein said power-source units are connected to each other at a location close to the location between said electrode and said workpiece.

8. An electric power-source apparatus for a discharge processing machine, according to claim 5, comprising a plurality of power-source units for the discharge processing machine, each of which comprises a respective constant-current supply means and a respective output-current interrupting unit, wherein at least one of said plurality of electric power-source units for the discharge processing machine is connected to one of a corresponding one of a plurality of electrodes and a workpiece.

9. An electric power-source apparatus for a discharge processing machine, comprising:
- a constant-current supply having a first switching element;
- an output current interrupting unit for interrupting an output current having a plurality of switching elements which are connected to each other in a bridge arrangement, said output current interrupting unit being operative to control the supply of processing power to a location between an electrode and a workpiece which are arranged within a dielectric;
- an output current command unit for providing an upper-limit addition value and a lower-limit subtraction value;
- a comparator for comparing output-current detecting values from said constant-current supply, and said upper-limit addition value and lower-limit subtraction value of said output current command unit with each other, respectively;
- a first flip flop unit for controlling output current from said constant-current supply;
- a timer unit controlled by a discharge command and a discharge-time command for controlling said output current interrupting unit;
- a second flip flop unit for controlling said output-current interrupting unit;
- a third flip flop unit for reversing the polarity of output voltage in response to an output by said second flip flop unit;
- an integrating unit for integrating voltage between said electrode and said workpiece; wherein an output from said integrating unit and a reversed polarity value of said output are so switched that a value of said integrating unit is brought to zero, and is added to a value of said discharge-time command.

10. An electric power-source apparatus for a discharge processing machine, according to claim 9, further comprising a multiplying unit for multiplying an output signal from said second flip flop unit an output signal from said first flip flop unit, and the product is used to control said first switching element.

11. An electric power-source apparatus for a discharge processing machine, according to claim 9, comprising a plurality of power-source units for the discharge processing machine, each of which comprises a respective constant-current supply means and a respective output-current interrupting unit, and a plurality of conductors through which processing power is supplied, wherein said conductors are the same in length as each other and are located close to each other, and wherein said power-source units are connected to each other at a location close to the location between said electrode and said workpiece.

12. An electric power-source apparatus for a discharge processing machine, according to claim 9, comprising a plurality of power-source units for the discharge processing machine, each of which comprises a respective constant-current supply, unit and respective output-current interruption unit, wherein at least one of said plurality of electric power-source units for the discharge processing machine is connected to one of a corresponding one of a plurality of electrodes and said workpiece.

* * * * *